United States Patent
Kennedy

[11] Patent Number: 6,086,740
[45] Date of Patent: Jul. 11, 2000

[54] MULTIPLEXED MICROFLUIDIC DEVICES AND SYSTEMS

[75] Inventor: Colin B. Kennedy, Mill Valley, Calif.

[73] Assignee: Caliper Technologies Corp., Mountain View, Calif.

[21] Appl. No.: 09/182,827

[22] Filed: Oct. 29, 1998

[51] Int. Cl.$^7$ ..................................................... G01N 27/26
[52] U.S. Cl. ............................................ 204/601; 422/99
[58] Field of Search .................................. 204/600, 601; 422/99, 129

[56] References Cited

U.S. PATENT DOCUMENTS

| | | |
|---|---|---|
| 4,390,403 | 6/1983 | Batchelder . |
| 4,908,112 | 3/1990 | Pace . |
| 5,126,022 | 6/1992 | Soane et al. . |
| 5,498,392 | 3/1996 | Wilding et al. . |
| 5,571,410 | 11/1996 | Swedberg et al. . |
| 5,580,523 | 12/1996 | Bard ............................................ 422/50 |
| 5,585,069 | 12/1996 | Zanzucchi et al. . |
| 5,593,838 | 1/1997 | Zanzucchi et al. ........................... 436/6 |
| 5,603,351 | 2/1997 | Cherukuri et al. . |
| 5,635,358 | 6/1997 | Wilding et al. . |
| 5,637,469 | 6/1997 | Wilding et al. . |
| 5,750,015 | 5/1998 | Soane et al. . |
| 5,779,868 | 7/1998 | Parce et al. . |
| 5,800,690 | 9/1998 | Chow et al. . |
| 5,972,187 | 10/1999 | Parce et al. .............................. 204/453 |

FOREIGN PATENT DOCUMENTS

| | | |
|---|---|---|
| 9604547 | 2/1996 | WIPO . |
| 9702357 | 1/1997 | WIPO . |

OTHER PUBLICATIONS

Dasgupta, P.K. et al., "Electroosmosis: A Reliable Fluid Propulsion System for Flow Injection Analysis," *Anal. Chem.* 66:1792–1798 (1994), month unknown.

Jacobson, S.C. et al., "Fused Quartz Substrates for Microchip Electrophoresis," *Anal. Chem.* 67:2059–2063 (1995), month unknown.

Manz, A. et al., "Electroosmotic pumping and electrophoretic separations for miniaturized chemical analysis systems," *J. Micromech. Microeng.* 4:257–265 (1994), month unknown.

Ramsey, J.M. et al., "Microfabricated chemical measurement systems," *Nature Med.* 1:1093–1096 (1995), month unknown.

Seiler, K. et al., "Planar Glass Chips for Capillary Electrophoresis: Repetitive Sample Injection, Quantitation, and Separation Efficiency," *Anal. Chem.* 65:1481–1488 (1993), month unknown.

Seiler, K. et al., "Electroosmotic Pumping and Valveless Control of Fluid Flow Within a Manifold of Capillaries on a Glass Chip," *Anal. Chem.* 66:3485–3491 (1994), month unknown.

Woolley, A.T. et al., "High–Spped DNA Genotyping Using Microfabricated Capillary Array Electrophoresis Chips," *Anal. Chem.* 69:2181–2186 (1997), month unknown.

*Primary Examiner*—Jill Warden
*Assistant Examiner*—Alex Noguerola
*Attorney, Agent, or Firm*—Matthew B. Murphy

[57] ABSTRACT

Multiplexed microfluidic devices include a plurality of modular microfluidic elements, all of which are attached to a common frame or substrate, which itself includes one or more common input elements that are connected to corresponding input elements within several or each of the microfluidic modules for use in common control and/or common detection operations for each of the modules.

31 Claims, 6 Drawing Sheets

6,086,740

MULTIPLEXED MICROFLUIDIC DEVICES AND SYSTEMS

BACKGROUND OF THE INVENTION

Microfluidic devices and systems have recently been developed for performing large numbers of different analytical and/or synthetic operations within the confines of very small channels and chambers that are disposed within small scale integrated microfluidic devices. These systems have proven extremely effective for performing a wide range of desired analytical operations at extremely high throughput rates, with much lower reagent requirements, and in a readily automatable format.

Despite the improvements in throughput and accuracy of individual microfluidic systems, as with any operation, multiplexing the basic system can substantially increase throughput, so that the operations of the system are carried out in highly parallelized systems. Specifically, by coupling together large numbers of individual systems, one can multiply the throughput of the system by the number of parallel systems.

Microfluidic devices and systems, because of their extremely small space requirements are particularly well suited for parallelization or multiplexing because large numbers of parallel analytical fluidic elements can be combined within a single integrated device that occupies a relatively small area, e.g., from about 1 cm$^2$ to about 50 cm$^2$. An example of such a parallelized or multiplexed device is described in, e.g., Published International Application No. 98/00231, which describes a microfluidic device, system and method for performing high throughput screening assays.

Because microfluidic systems can have complicated manufacturing processes, production yields of perfectly functioning devices can be relatively low. In the case of highly parallelized, multiplexed systems, the yield problems can be multiplied by the number of multiplexed or parallel systems. Merely by way of illustration, one might have a process of fabricating a channel network in a typical, single operation microfluidic device, where one of ten attempts at fabricating a functional channel network fails. Assuming that this probability of failure is the same for each separate channel network in a multiplexed system, e.g., including ten separate channel networks, one can see that the probability of producing a perfectly functioning multiplexed system is substantially reduced. This probability is further decreased as the number of multiplexed elements is increased.

Accordingly, it would generally be desirable to provide multiplexed microfluidic devices that have structures that permit higher fabrication yields, as well as methods of fabricating such devices. The present invention meets these and other needs.

SUMMARY OF THE INVENTION

In a first aspect, the present invention provides a multiplexed microfluidic device, comprising a plurality of microfluidic modules. Each module is comprised of a discrete channel network disposed within. The device also includes at least a first substrate having at least a first fluidic element disposed within. The plurality of microfluidic modules are attached to the first substrate such that the at least first fluidic element is in fluid communication with a fluidic element disposed within each of the microfluidic modules.

Another aspect of the present invention is a multiplexed microfluidic device, comprising a plurality of microfluidic modules. Each module has a microfluidic channel network disposed within. A common frame is attached to each of the plurality of modules. The frame includes a common input element which is operably coupled to each of the plurality of microfluidic modules.

Another aspect of the present invention is a microfluidic system, comprising a multiplexed microfluidic device that comprises a plurality of microfluidic modules attached to a first substrate. The fluidic element in the first substrate is in fluid communication with at least one of a first and second intersecting microscale channels disposed within each of the plurality of microfluidic modules. The system also includes a material transport system operably coupled to each of the first fluidic element and the first and second microscale channels, for transporting material from the first fluidic element into and through the at least one of the first and second microscale channels. A detector is disposed in sensory communication with at least one of the first and second channels in the microfluidic modules, for detecting a signal within the at least one channel.

Another aspect of the present invention is a method of manufacturing a multiplexed microfluidic device, comprising providing a substrate having at least a first fluidic element disposed therein. A plurality of openings are disposed from a surface of the substrate to the fluidic element. A plurality of microfluidic modules is attached to the substrate. Each microfluidic module comprises at least a first fluidic element disposed therein and an opening providing access from a surface of the microfluidic module to the first fluidic element. The modules are attached to the substrate such that each of the plurality openings on the substrate is in fluid communication with an opening on a separate microfluidic module.

DETAILED DESCRIPTION OF THE INVENTION

I. General

Figure 1:
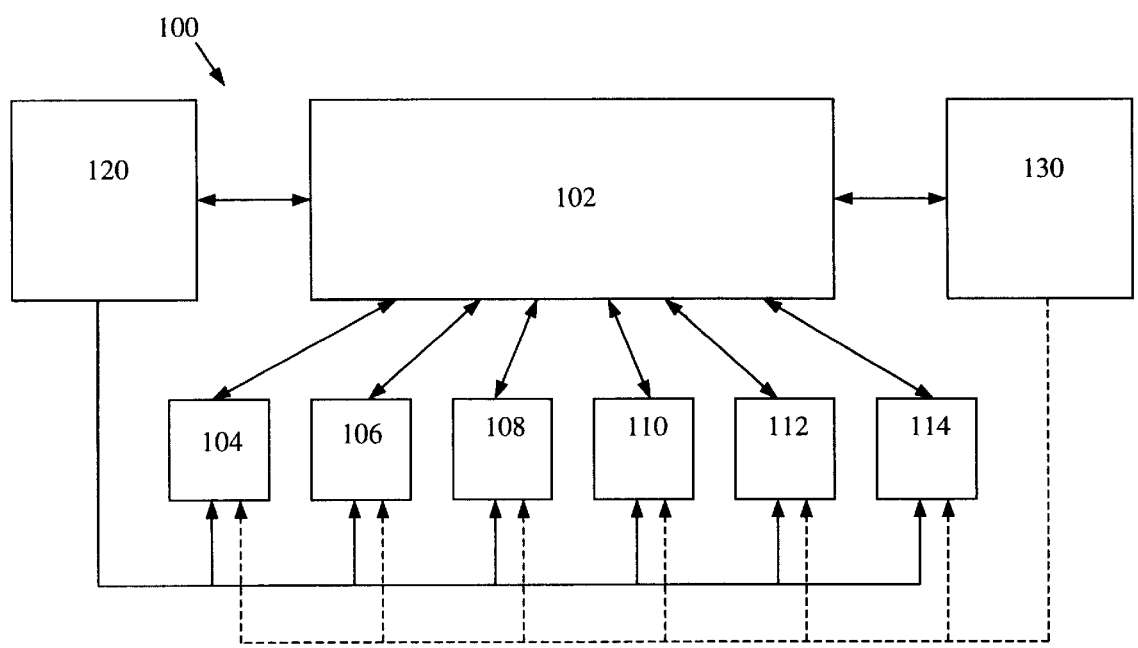
FIG. 1 schematically illustrates an overall system incorporating a multiplexed microfluidic device of the present invention.

In general, the present invention provides multiplexed microfluidic devices that include a plurality of modular microfluidic elements, all of which are attached to a common frame or substrate, which itself includes one or more common input elements that are connected to corresponding input elements within several or each of the microfluidic modules. By modularizing the individual microfluidic elements that are being multiplexed, failures in the fabrication processes that would otherwise result in nonfunctional multiplexed devices, e.g., in non-modularized devices, will be confined to a single microfluidic module as opposed to the overall multiplexed device. Losses and costs due to such failures are thereby confined to the proportion of cost associated with a single module, as opposed to the entire multiplexed device.

Additional advantages of the multiplexed devices include the ability to physically isolate the microfluidic modules in some respects while permitting physical cooperation in others. For example, by providing a separation point in the substrates that form the microfluidic modules, one can effectively break up a light or thermally conductive path between channels in adjacent modules, allowing thermal or optical isolation between adjacent modules, while the common frame permits fluidic or electrical cooperation between the modules.

In order to gain the greatest advantage of these multiplexed parallelized systems, it is generally desirable that each of the different microfluidic modules has a common or connected input element, e.g., that is disposed in the frame or substrate. As used herein, the "input element" refers to an element of the microfluidic device or one of its microfluidic modules that receives a particular type of input to the overall device or one or more of the modules. Examples of particularly preferred input elements include energy input or control elements (i.e., electrical, optical, thermal, and the like), fluidic or reagent input elements (e.g., for introduction of buffers, reagents, samples and the like). In the case of a common input element that is disposed within the common frame, the input element distributes the particular input to corresponding input elements on several or each of the microfluidic modules included within the multiplexed device.

In a first aspect, the common substrate or frame provides a common fluidic element as the common input element, e.g., a channel, channel manifold, chamber, or reservoir, which is in fluid communication with the channel network in each of a plurality of the microfluidic modules that are attached to the frame. For example, where each microfluidic module utilizes a common fluid reagent or buffer, that reagent or buffer may be provided in the common fluidic element on the frame, e.g., a reservoir and/or fluidic manifold, for delivery of the common reagent to each of the separate modules. By providing a common fluidic element, the devices of the invention facilitate the placement of fluid reagents into the modules. Similarly, because the fluid reagent in the common fluidic element is homogeneous, it eliminates the potential for module to module variation for at least that reagent. This common fluidic element typically takes the form of a large reagent reservoir, control port or node or fluidic manifold, through which reagents or control operations that are common to each module in the overall device may be applied thereby reducing the overall number of separately controlled elements within the multiplexed device.

In addition to the advantages of higher fabrication process yields, these modular systems also provide advantages of flexibility in device design and construction. In particular, one can tailor the operations to be performed by a multiplexed device simply by selecting and attaching the modules that correspond to each of the different desired operations. These may all be the same operation and module, e.g., for performing multiple parallel analyses on a plurality of different materials, or they may be different modules, e.g., for performing a plurality of different analyses on a single sample material.

Generally, microfluidic devices and systems have been described for use in a variety of applications. For example, published International application No. WO 98/00231, describes microfluidic devices, systems and methods of using such devices and systems in carrying out a variety of high throughput, and even ultra high-throughput screening assays, e.g., pharmaceutical screening, clinical sample analysis, etc. U.S. patent application Ser. No. 08/845,754 filed Apr. 25, 1997, on the other hand, describes lower throughput microfluidic devices and systems for carrying out a variety of research oriented analyses, e.g., electrophoretic separations of proteins or nucleic acids. The multiplexed devices of the present invention are particularly suited for use in these and a variety of other applications, and particularly to those applications in which higher throughput is desired.

The transport of materials through the channel networks that are included within the multiplexed microfluidic devices of the present invention is generally carried out according to any one of a number of different methods. Such methods typically include pressure driven transport systems, integrated mechanical transport systems, electrokinetic systems, and hybrid systems that include elements from one or more of these. As used herein, pressure driven material transport systems typically move materials through the channel networks of the devices through the controlled application of a pressure (either positive or negative) to the various channels of the overall system, to selectively force or draw fluid into and through a particular channel at a particular rate. In the case of the multiplexed devices described herein, such pressure systems typically apply a pressure or vacuum at the termini of various channels in the channel networks and/or the common input elements in the frame or substrate to force and/or draw materials into particular channels of the entire system, e.g., frame and/or modules, in prescribed ratios and the like.

Further, through the controlled application of pressures, one can control relative amounts of material that are flowed into intersections, thus creating a valving or gating function without any integrated moving parts. Specifically, by controlling the amount of material that moves into an intersection from each channel that communicates at the intersection, one can effectively direct the material from one channel into another, with a minimal amount of diffusion into the other channels. Further, by switching the applied pressures, one can switch the material direction from one channel to another. A directly analogous process for controlled material transport at intersections is described below with respect to controlled electrokinetic material transport. A variety of other pressure driven material transport systems have been described (See, e.g., WO 97/02357, U.S. Pat. Nos. 5,498,392, 5,635,358 and 5,637,469, each of which is incorporated herein by reference).

As noted above, the multiplexed devices described herein optionally include integrated mechanical material transport systems, e.g., microfabricated pumps and valves for use in moving fluidic materials into and through selected channels within the device. Again, such integrated mechanical elements have generally been described in the art. For example, published International Patent Application No. 97/02357 describes microfluidic systems that incorporate small scale diaphragm pumps and valves that are operated through an external actuator (pressure or electrical) to selectively move fluidic materials through a small scale channel networks.

In still other aspects, controlled electrokinetic material transport methods are used to move materials through the channel networks of the microfluidic modules, to move material into the channel networks from the common fluidic element in the frame or substrate, and/or to introduce externally stored materials into the channel networks of each module, e.g., through an external sampling capillary element. Examples of such controlled electrokinetic transport are described in Published International Patent Application No. 96/04547. Controlled electrokinetic transport typically involves the application of an electric field over the length of a channel to create a voltage gradient along that channel length. This voltage gradient then results in the movement of material along that channel. In particular, charged species contained within the channel typically have a mobility toward the electrode that is charged oppositely to the charged species. This mobility is termed "electrophoresis" or electrophoretic mobility." Further, where a channel has a surface with charged groups thereon, the resulting ion sheath that is formed at that surface in aqueous solutions can result in a movement of bulk fluid under the application of an electric field. This bulk fluid movement is termed "electroosmotic flow." Typically, electrokinetic material transport systems comprise a combination of electrophoretic and electroosmotic mobilities.

Depending upon the particular application, however, either electrophoresis or electroosmosis may be favored, and thus enhanced relative to the other. Enhancing electrophoresis versus electroosmosis in such channel systems is typically accomplished by masking surface charges within the channels through the use of appropriate matrices or surface treatments that are well known in the art of capillary electrophoresis. Enhancing electroosmosis versus electrophoresis on the other hand, typically involves the use of different fluid regions within the channel having varied ionic strengths or conductivities. Specifically, low ionic strength regions are used as spacers and to drive electroosmotic flow, while materials to be transported are maintained in relatively high salt solutions. The use of high salt solutions for containing the materials to be transported reduces the electric field to which such materials are exposed, and thereby reduces electrophoresis of those materials. Material transport at channel intersections is also selectively controlled by applying electric fields of varying strengths through the various channels that meet at the intersection. These controlled electrokinetic material transport systems are described in substantial detail in Published International Patent Application Nos. 96/04547 and 98/22811, which is incorporated herein by reference. The use of such systems which compensate for electrophoretic biasing of transported materials, as well as for use with an external sampling capillary element is described in detail in U.S. Pat. No. 5,779,868. In still other alternate aspects, material transport systems may be used that employ a hybrid of electrokinetic forces and applied pressures. In particular, the devices and systems of the present invention often employ integrated electroosmotic pressure pumps to generate positive and/or negative pressures within the various channels and fluidic elements in the channel networks within the modules and in the common frame/substrate. These pressures are then used to drive the movement of fluid materials within the various channels, as described above. Examples of these electroosmotic pressure pumps and their uses in microfluidic devices and systems are described in substantial detail in copending U.S. patent application Ser. No. 08/937,958, filed Sep. 25, 1997, and incorporated herein by reference.

In the case of electrokinetic material transport systems or hybrid electrokinetic/pressure-based material transport systems, electrical contact with the channels or electrokinetic pumps is typically accomplished through the use of appropriate electrodes placed into communication with fluids that are in communication with fluids in the channels of the devices. Typically, these electrodes are placed into contact with fluids that are disposed in reservoirs at the unintersected termini of channels that are contained in the system. Examples of preferred types of interfaces between electrical controllers and microfluidic systems are described in, e.g., U.S. patent application Ser. No. 08/919,707 filed Aug. 29, 1997, and incorporated herein by reference. In the context of the multiplexed devices of the present invention, interfacing of electrical controllers illustrated and described below with reference to FIG. 4.

II. Multiplexed Devices

Figure 2:
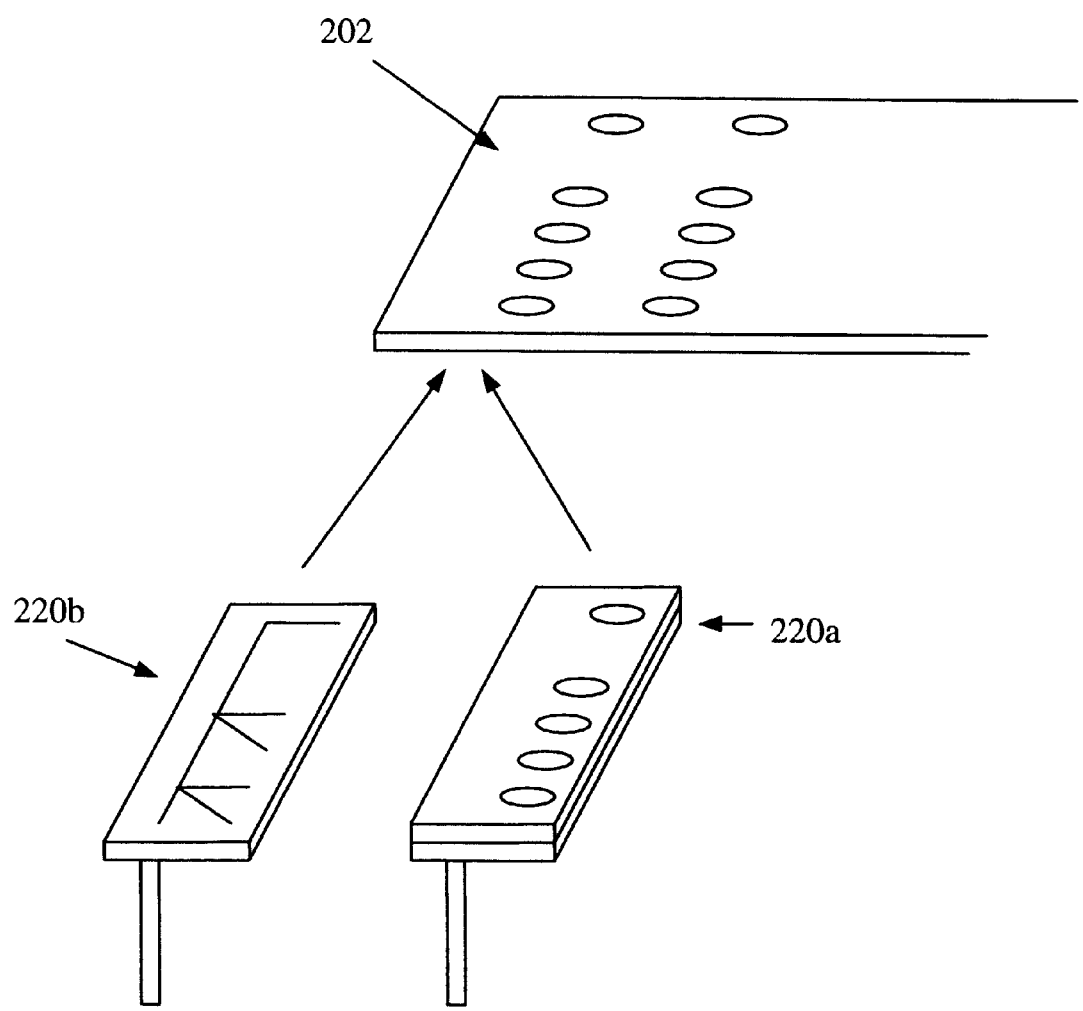
FIG. 2 illustrates alternate assemblies for certain embodiments of the present invention.

As noted above, the present invention provides multiplexed microfluidic devices, systems and methods of fabricating these devices and systems, where the multiplexed device includes a number of microfluidic modules. As used herein, the microfluidic modules are comprised of a body structure in which a microfluidic element is disposed. Microfluidic elements typically include fluid handling structures such as channels or conduits, chambers, ports, reservoirs and the like, that are disposed within a body structure of the module itself, or the combination structure of the body of the module and the frame, provided that such fluid handling structures have at least one microscale internal cross-sectional dimension. For the purposes of the present discussion, microscale cross-sectional dimensions include width, depth, diameter, or length of a fluidic element which is between about 0.1 $\mu$m and about 1 mm, and preferably, in a range of from about 1 $\mu$m to about 500 $\mu$m and more preferably, between about 1 $\mu$m and about 200 $\mu$m. Microfluidic elements are typically fabricated using two or more substrate layers, where at least one layer has a network of microscale grooves fabricated into its surface. When the layers are mated or laminated together, the grooves are sealed to define the microfluidic channel network of the device or module. In the case of the present invention, the substrate layers may comprise at least two substrate layers which, when mated, define a microfluidic module. Alternatively, the module may comprise a single substrate layer upon which the grooves are fabricated, which form the microfluidic channel network when the module substrate is mated or bonded to the common frame. An illustration of both types of assemblies are illustrated in FIG. 2. As shown in FIG. 2, a microfluidic module 220 is optionally a self-contained integrated microfluidic element, e.g., 220a or is a layer which defines the microfluidic element when mated with the frame 202, e.g., module 220b.

Typically, each of the microfluidic modules is attached to a common structural element, typically described herein as a substrate or frame, which includes at least one common input element, e.g., a control element, fluidic element and/or detection element, that interfaces with several, if not each of the plurality of microfluidic modules via corresponding and appropriate input elements on those modules, e.g., control, fluidic or detection inputs. In particular, the common frame or substrate, in addition to commonly fixing the modules, e.g., for common movement, positioning, etc., provides a convenient method of interfacing elements of each module to external control systems and/or detection systems and/or fluid sources. Specifically, where certain elements of each of a plurality of modules are to be operated under the same conditions, e.g., controlled in the same manner, provided with the same fluid reagents or buffers, or subjected to the same type of detection, the interfacing of each of these elements in each of the modules, e.g., with an external controller (e.g., electrical or pressure based), a fluid source or a detector, is provided through the common substrate or frame.

Figure 3:
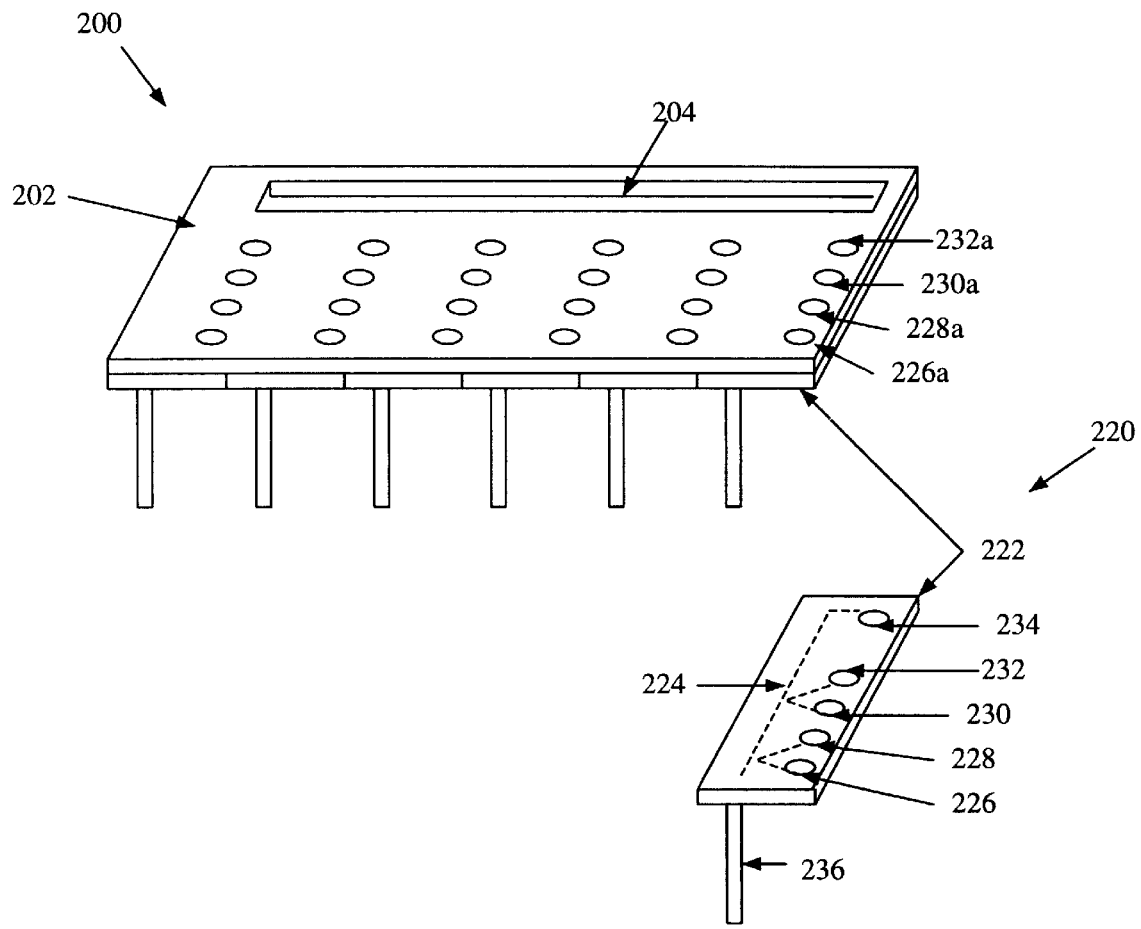
FIG. 3 illustrates an embodiment of a multiplexed microfluidic device of the present invention incorporating a common fluidic element.
Figure 4:
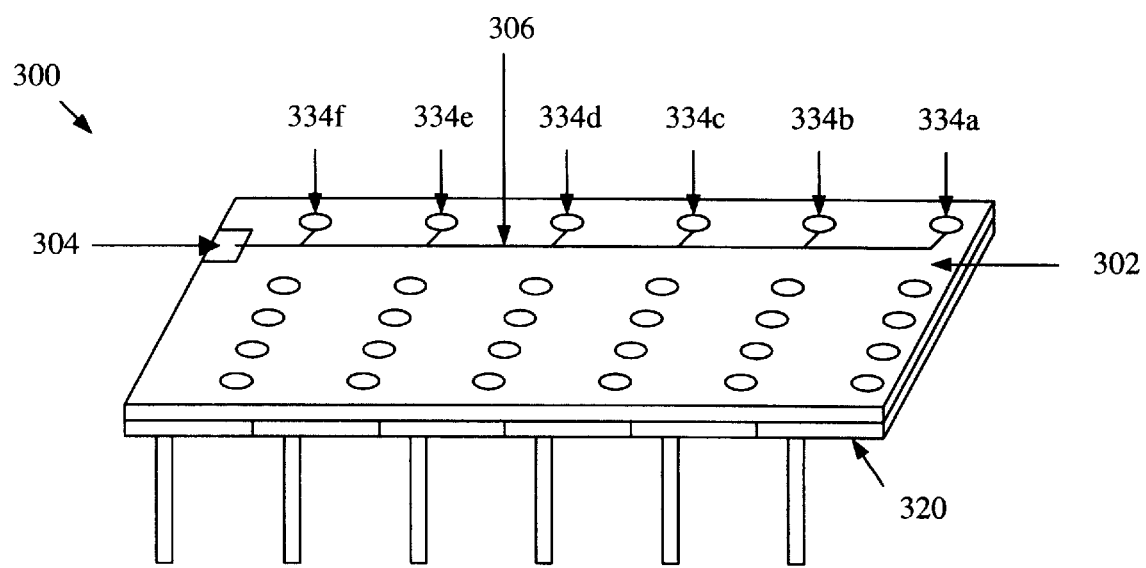
FIG. 4 illustrates an alternate embodiment of the multiplexed device of the present invention incorporating a common electrical control element.
Figure 5:
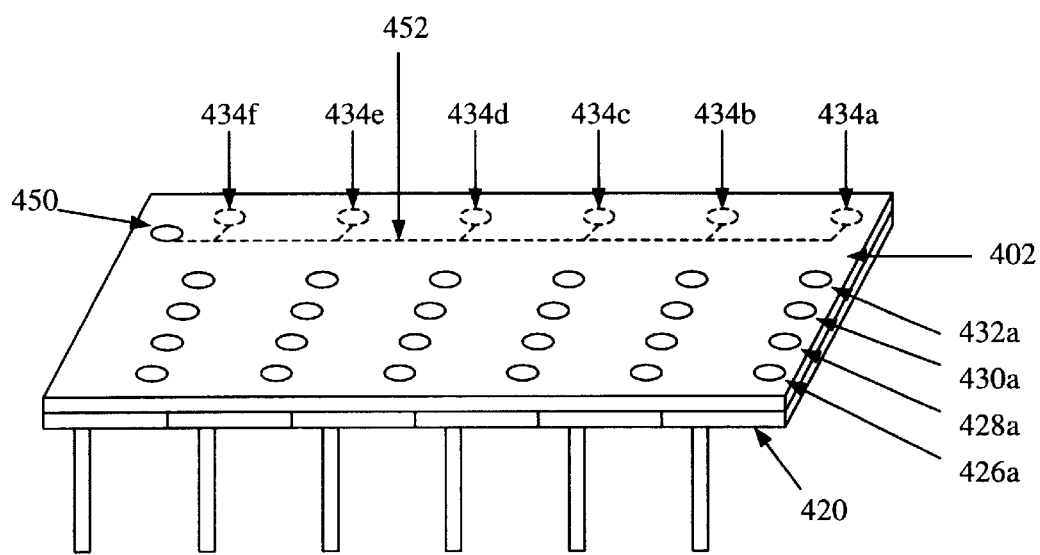
FIG. 5 illustrates an alternate embodiment of a multiplexed device of the present invention incorporating a common pressure manifold as a common control element.

A schematic illustration of a multiplexed microfluidic device and a system incorporating the device is schematically illustrated in FIG. 1. As shown, the device 100 includes a common frame or substrate 102, and a plurality of microfluidic modules 104–114. Each of the modules is attached to and in communication, e.g., fluidic, pressure, electrical, sensory or thermal, with the frame 102 (as shown by the arrows). Typically, at least one input function is provided commonly to each of the modules, via a common input element in the frame 102, e.g., a manifold for delivering a fluid input to reservoirs in each module, and electrical manifold or circuit network for delivering electrical power to control nodes on each of the modules, pressure port/manifold arrangements, and the like. Other input functions may be provided to each of the modules separately, e.g., where aspects of each different module are to operate differently, e.g., perform different assays with different reagents, or are subject to different control levels. Input elements that are not shared among a plurality of microfluidic modules are termed "non-common" input elements. Such non-common input elements may be entirely separate from the frame, e.g., disposed solely in the microfluidic module, or they may be disposed, in part, in or on the frame, e.g., as shown in FIGS. 3–5.

In certain aspects of an overall system of the invention which incorporate common control input elements, a controller 120 provides an input function in the form of control functions, e.g., applied pressures or electrical potentials to drive fluid movement, heating, etc. As shown, the controller is operably coupled to a common control element in the frame 102, as shown by arrow 122, and in communication with separate control elements on each of the modules via arrows 124a–124f.

In addition to controller 120, the overall system typically includes a detector 130 disposed in sensory communication with at least one fluidic element in the overall integrated device. This is optionally one or both of a common fluidic element on the frame 102 or a fluidic element that comprises a part of the channel networks in each of the microfluidic modules 104–114 (as shown by the dashed arrows), for detecting results of the operations performed in each of the modules. As used herein, the phrase "in sensory communication" refers to a detection system that is positioned to receive a particular signal from a particular location, e.g., a microscale channel. For example, in the case of optical detectors, sensory communication refers to a detector that is disposed adjacent a transparent region of the microscale channel in question, and configured such that an optical signal from the channel, e.g., fluorescence, chemiluminescence, etc., is received and detected by the optical detector. Such configuration typically includes the use of an appropriate objective lens and optical train positioned in sufficient proximity to the fluidic element or channel to gather detectable levels of the optical signal. Microscope based detectors, e.g., fluorescence detectors are well known in the art. See, e.g., U.S. Pat. Nos. 5,274,240 and 5,091,652, each of which is incorporated herein by reference.

In the case of electrochemical detectors, sensory communication typically refers to a detector which includes an electrochemical sensor disposed within the channel network such that it is capable of detecting electrochemical signals within the channel, e.g., changes in pH, conductivity, etc.

In an alternative or additional aspect, a common energy input element may be provided on the common frame or substrate. Typically, the common energy input receives an amount of energy necessary for one or more functions of the overall multiplexed device. The energy input is then distributed through the common frame to each of the microfluidic modules so that it can be used to perform the particular function. In a first aspect, the energy input is used to control the functions performed within the overall device and/or individual modules. In one example, the common energy input is a control node that receives electrical energy such as an applied voltage and/or current, and distributes that electrical energy to corresponding nodes on the plurality of microfluidic modules.

For example, the common energy input may include a control input into a common control element, which is then operably connected to control elements on each of the microfluidic modules. For example, where the microfluidic modules are electrically controlled, e.g., devices that incorporate electrokinetic material transport, the common control element optionally includes a common electrical interface, which is separately operably coupled to each of the microfluidic modules to provide that electrical control to each module. Electrokinetic transport systems for microfluidic devices are described above and in e.g., Published International Patent Application No. WO 96/04547, which is incorporated herein by reference.

Where pressure (positive or negative) is used to drive the operation of the microfluidic device, e.g., force fluid movement, or control valves and/or pumps, the common frame optionally includes a pressure manifold, typically in the form of a series of channels fabricated into the frame, for delivering pressure to the appropriate control elements, e.g., channel termini, pumps or valves, on each of the microfluidic modules.

Although described as distinct or separate elements, it will be appreciated that a common energy input may comprise the same structure as a common fluidic input and/or a common pressure input. Specifically, a common fluidic input may comprise a common reservoir or trough into which common reagents are deposited for distribution to the microfluidic modules. That common reservoir or trough may also be the point at which pressure or electrical energy is applied to the overall system and distributed to the various modules.

A variety of other input/control elements may be provided operably coupled to a common control element on the frame, as described herein, in addition to those controlling fluid or material transport functions, including thermal control elements, e.g., peltier devices, heat sinks and the like.

One example of a multiplexed microfluidic device according to the present invention is illustrated in FIG. 3. As shown the overall device 200, includes a common frame or substrate 202 that includes at least a first common fluidic element, e.g., which is in separate fluid communication with each of the separate modules, such as trough 204 that is in separate fluid communication with port 234, on each of a plurality of microfluidic modules 220. As used herein, the phrase "in separate fluid communication" refers to a fluidic element that separately communicates with fluidic elements on each of the separate microfluidic modules, in parallel, and does not communicate with one module through a connection to another module, e.g., stacked modules. As shown, each module 220 comprises a body structure 222 which has an external capillary element 236 attached to it for sampling different materials into the channel network 224 that is contained within the interior portion of the module 220, or module frame combination. Ports 226–234 are positioned in the body structure 220, such that they will be in fluid communication with a common fluidic element on the substrate or frame 202, e.g., trough 204, when the modules are attached to the frame 202. Although illustrated as trough 204, the common fluidic element present in the frame 202 may take on a variety of other forms and perform a variety of other functions. For example, the common fluidic element may include a single reservoir fluidly connected to a network of channels (not shown) disposed within the frame 202 that communicate with one or more fluidic elements or ports in the body structure of the modules to supply buffers, reagents or other common materials to each of the different modules. Alternatively or additionally, the common fluidic element may provide a common access port for all of the modules, i.e., for application of pressure, voltage or current, e.g., to move materials through the channel networks that are disposed in each of the modules. Although not always required, in those cases where the frame covers a portion or all of the surface of the module, e.g., as shown in FIG. 3, ports will generally be provided in the frame to provide separate access to the corresponding ports on each of the modules, e.g., ports 226a, 228a, 230a and 232a. Although the modules are illustrated as incorporating external capillary elements, it will be appreciated that a number of different module conformations can be used. For example, each module may include sample reservoirs for containing separate sample materials, each of which is in fluid communication with the channel network within the module.

Another embodiment of the present invention is illustrated in FIG. 4. As shown, the device 300 is substantially similar to the device shown in FIG. 3, except that the common substrate or frame 302 includes a common electrical control element. As shown, the common electrical control element includes an electrical contact pad 304 that is operably coupled to each of reservoirs 334a–334f via an electrical line 306, which may take a variety of forms, including, e.g., a wire laid along the surface of the substrate 302, or an electrically conductive layer that is patterned over that surface. The common electrical element (304–306) is used to deliver the same electrical energy, e.g., current, voltage or power, to each of the different microfluidic modules 320. Interfacing electrical controllers with common or non-common electrical inputs on the microfluidic devices is carried out substantially as described in U.S. patent application Ser. No. 08/919,707, filed Aug. 29, 1997, and incorporated herein by reference.

Figure 5A:
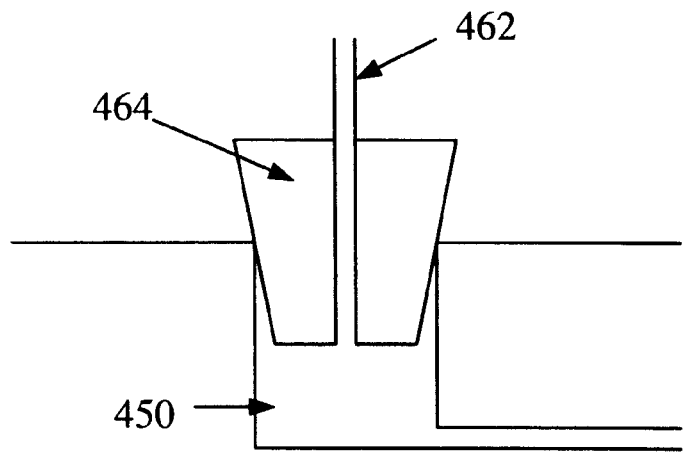
FIGS. 5A and 5B illustrate alternate options for interfacing pressure or vacuum sources with a pressure port on certain aspects of the multiplexed devices of the present invention.
Figure 5B:
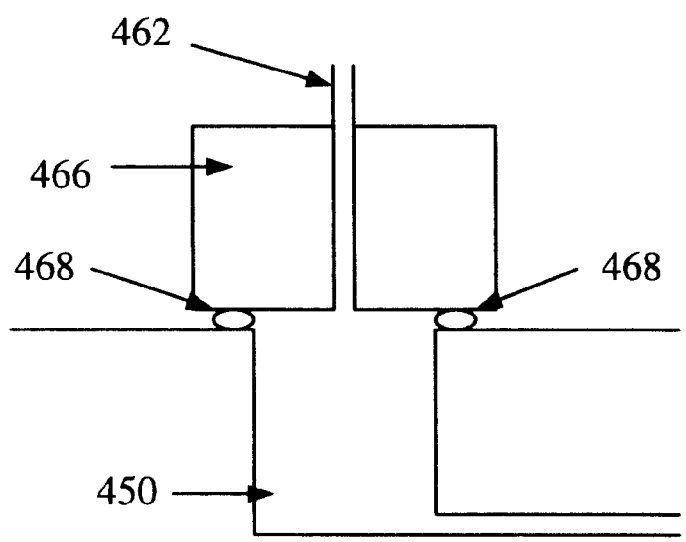

FIG. 5 illustrates a multiplexed device of the present invention that includes within the frame, a common pressure based input or control element. In particular, the device 400 is similar to those illustrated in FIGS. 2 and 3, and again includes a plurality of microfluidic modules 420 attached to a common frame 402. In the device shown in FIG. 5, however, a common pressure input 450 and pressure manifold 452 are provided. In particular, a common pressure is applied to input port 450 and distributed to the same ports (e.g., ports 434a–f) on each of the microfluidic modules. In the case of the device shown in FIG. 5, a vacuum source may be applied to the common pressure manifold in order to draw fluids through the channel network (not shown) in each of the modules. Other control parameters may then be supplied on an individual basis to each of the modules 420 via the separate ports for each module, e.g., ports 426a–432a. Interfacing of a pressure or vacuum source with a common or non-common pressure input or port is generally carried out by any of a variety of known methods. Examples of optionally practical methods are illustrated in FIGS. 5A and 5B. As shown, the vacuum or pressure source (not shown) is coupled to the port 450 of the device via an appropriate pressure line 462. The pressure line includes a structure 464 at its end, which permits the sealable fitting of the pressure line over the port 450. As shown in FIG. 5A, the structure comprises a truncated cone structure allowing partial insertion of the structure and end of the pressure line into the port. Once inserted, the edge of the sealing structure 464 contacts the edge of the port 450 to seal the port 450. Alternatively, as shown in FIG. 5B, the sealing structure comprises a combination of a flat surfaced structure 466 and a gasket or o-ring disposed either on the sealing structure or around the port 450. Upon placement of the sealing structure over the port 450, the gasket or o-ring 468 forms a seal between the pressure line 462 and the port 450.

III. Operation of Devices

In operation, the overall device may be used to carry out a large number of analytical operations on fluid materials. For example, the multiplexed systems may be used to perform screening assays on large numbers of pharmaceutical candidate compounds and the like, in parallel within each of the separate modules. For example, with reference to FIG. 3, a reagent that is common to the operations being performed in each of the modules, e.g., a buffer, enzyme or substrate solution, is placed into the common fluidic element, e.g., trough 204, on the frame 202. Other reagents used in the operation can be introduced separately into each module, e.g., through ports 226a–232a, or can be delivered via another common fluidic element (not shown) which may be substituted for the various individual reservoirs. Different materials that are to be assayed may be introduced into each of the modules 222 via the external capillary element 236. Use of such external sampling capillaries is described in U.S. Pat. No. 5,779,868, which is incorporated herein by reference, and published International Patent Application No. WO 98/00231, previously incorporated herein.

In the case of the multiplexed device shown, a waste buffer will typically be placed in trough 204. Diluent buffer typically will be placed in reservoirs 228a and 232a. One component of a biochemical system that is to be screened, e.g., an enzyme, receptor or the like, is placed into reservoir 226a, while the complementary component of the biochemical system, e.g., the substrate, ligand or the like, is placed into reservoir 230a. During the assay, both components of the biochemical system are flowed at an appropriately diluted level, through the channel network 224 toward the waste reservoir 234 (or trough 204). Sample materials are periodically introduced into the channel network via the capillary element 236, whereupon they will mix with the biochemical system components. If these sample materials have an effect on the interaction of these components, it will be detected within the channel network as a deviation in the steady state level of interaction of these components. Again, different assays, and reagents which produce detectable results are described in significant detail in WO 98/00231.

By supplying a common reagent within a common fluidic element, e.g., trough 204, it saves the operator from allocating the reagent into each of the different modules. Further, as shown in FIG. 3, the common fluidic element is also useful in supplying a common control node for providing a common control parameter to each of the modules. For example, where the overall device uses controlled electrokinetic material transport systems to move materials through the channel network, a common fluidic element, e.g., trough 204, can be used to deliver the same electrical energy, e.g., current, voltage or power, to the same node in each of the separate microfluidic modules 222, e.g., port 234. It will be appreciated that where the separate modules are performing the same basic operation, e.g., the same assay, multiple common fluidic elements may be provided which deliver the same fluids and control parameters to corresponding ports or elements in each of the separate modules.

As discussed herein, the multiplexed devices are typically operated in conjunction with one or more additional or ancillary apparatuses or instruments, such as a controller instrument, a detector, or the like. Such ancillary apparatuses therefore, typically include an appropriate mount or interface for the multiplexed device. Again, such mounts and interfaces are generally described in U.S. patent application Ser. No. 08/919,707, previously incorporated herein.

As noted above, the electrical connection of the multiplexed device with an electrical controller is typically accomplished by providing electrodes, that are operably coupled to the electrical controller(s), disposed in contact with fluid that is disposed in the various ports of the device, e.g., trough 204 and ports 226a–232a. These electrodes then supply the necessary voltage, current or power for driving the operation of the overall device.

IV. Fabrication

Fabrication of the individual modules, as well as the device as a whole, may be carried out by fabrication methods that are well known in the art. For example, in the case of the microfluidic modules, microfluidic channel networks are preferably fabricated as grooves into a planar surface of at least a first planar substrate. A second substrate is then overlaid and bonded to the planar surface of the first substrate to seal the grooves and thereby define the channels of the device. In the context of the present invention, the second substrate may be a separate substrate that is mated to the first planar substrate to define a self-contained microfluidic module, e.g., that contains sealed channels. Alternatively, the second substrate may comprise the common substrate or frame of the multiplexed device. Specifically, the separate module may comprise the first planar substrate having the grooves fabricated into a surface thereof. Upon mating of the module with the common frame or substrate, the grooves are sealed to define the channels within the overall multiplexed device, e.g., as shown in FIG. 2.

In the case of silica-based substrates, thermal bonding methods are generally preferred, while polymer based substrates may be thermally bonded, albeit at significantly lower temperatures than silica substrates, or alternatively, they may be bonded through ultrasonic welding techniques, solvent bonding techniques or use of appropriate adhesive bonding techniques.

All publications and patent applications are herein incorporated by reference to the same extent as if each individual publication or patent application was specifically and individually indicated to be incorporated by reference. Although the present invention has been described in some detail by way of illustration and example for purposes of clarity and understanding, it will be apparent that certain changes and modifications from the specifically described examples may be practiced within the scope of the appended claims.

What is claimed is:

1. A multiplexed microfluidic device, comprising:
   a plurality of microfluidic modules, each module comprising a discrete channel network disposed therein;
   at least a first substrate having at least a first fluidic element disposed therein;
   wherein the plurality of microfluidic modules are attached to the first substrate such that the at least first fluidic element is in separate fluid communication with a fluidic element disposed within each of the microfluidic modules.

2. The microfluidic device of claim 1, wherein each of the plurality of microfluidic modules comprises a body structure, and the fluidic element disposed within the microfluidic module comprises at least first and second intersecting microscale channels disposed within the body structure.

3. The microfluidic device of claim 1, wherein the at least one fluidic element comprises at least a first reservoir that is in fluid communication with a fluidic element in each of at least two of the microfluidic modules.

4. The microfluidic device of claim 1, wherein each of the plurality of microfluidic modules further comprises an external capillary element having a capillary channel disposed therethrough, the capillary channel being open at a first end and in fluid communication with the discrete channel network in each of the microfluidic modules at a second end.

5. The microfluidic device of claim 1, wherein the at least first fluidic element disposed in the first substrate comprises a plurality of additional fluidic elements, each of the plurality of additional fluidic elements being fluidly connected to a fluidic element on a different microfluidic module.

6. The microfluidic device of claim 5, wherein each of the plurality of fluidic elements disposed in the substrate comprises a reservoir disposed within the substrate.

7. The microfluidic device of claim 1, wherein the substrate comprises a plurality of openings disposed therein, each of the openings providing fluid communication between the at least one fluidic element disposed in the substrate and the fluidic element disposed in each of the microfluidic modules.

8. The microfluidic device of claim 7, wherein the substrate comprises at least a first port for providing access to the at least first fluidic element in the substrate, and wherein the microfluidic module comprises at least second and third ports providing access to the at least first and second intersecting microscale channels disposed in the body structure.

9. The microfluidic device of claim 8, wherein the first, second and third ports provide electrical access to the first fluidic element and the first and second microscale channels, respectively.

10. The microfluidic device of claim 1, wherein the body structure of each of the microfluidic modules comprises at least a first and second substrate layer bonded together, the discrete channel network in each microfluidic module being disposed at the interface of the bonded first and second layers.

11. A multiplexed microfluidic device, comprising:
    a plurality of microfluidic modules each module having a microfluidic channel network disposed therein, each microfluidic channel network comprising at least first and second miroscale channels; and
    a common frame attached to each of the plurality of modules, the frame including a common input element, the input element being operably coupled simultaneously to the microfluidic channel networks in each of the plurality of microfluidic modules.

12. The microfluidic device of claim 11, wherein the common input element is selected from an electrical input, a fluidic input and a pressure input.

13. The microfluidic device of claim 11, wherein the common input element comprises a common electrical input integrated into the common frame, the electrical input comprising an electrically conductive connector integrated into the common frame, the connector connecting a common electrical contact integrated into the common frame with electrical inputs on each of the plurality of microfluidic modules.

14. The microfluidic device of claim 13, wherein the electrically conductive connector comprises a conductive metal lead disposed between the common electrical contact and the electrical inputs on each of the plurality of microfluidic modules.

15. The microfluidic device of claim 13, wherein the common electrical contact comprises a reservoir, and the electrically conductive connector comprises a channel disposed between the reservoir and electrical inputs on each of the plurality of microfluidic modules, the reservoir and channel comprising an electrically conductive medium disposed therein.

16. The microfluidic device of claim 11, wherein the common input element comprises a common fluidic input disposed in the common frame, the common fluidic input comprising a reservoir that is in fluid communication with a fluid input on each of the plurality of microfluidic modules.

17. The microfluidic device of claim 16, wherein the common fluidic element is in fluid communication with the fluid element of each of the microfluidic modules via a plurality of channels, each channel being in fluid communication with the common reservoir at a first end of the channel and with a fluid input of a microfluidic module at a second end of the channel.

18. The microfluidic device of claim 11, wherein the common input element comprises a common pressure input, the common pressure input comprising at least a first pressure port disposed in the common frame, an a plurality of channels disposed in the common frame, each channel communicating with the at least one pressure port at a first end of the channel and with a pressure input on a microfluidic module at a second end of the channel.

19. The microfluidic device of claim 18, wherein the common pressure port is configured to sealably receive a pressure or vacuum source.

20. The microfluidic device of claim 19, wherein the common pressure port comprises a gasket disposed around the port, for sealably receiving the pressure or vacuum source.

21. The microfluidic device of claim 11, wherein each of the microfluidic modules comprises at least one non-common input element.

22. The microfluidic device of claim 21, wherein the at least one non-common input element is selected from an electrical input element, a fluidic input element and a pressure input element.

23. The microfluidic device of claim 22, wherein the non-common input element is disposed at least in part, in the common frame.

24. A microfluidic system, comprising:
a multiplexed microfluidic device that comprises a plurality of microfluidic modules attached to a first substrate, wherein a fluidic element in the first substrate is in fluid communication with at least one of a first and second intersecting microscale channels disposed within each of the plurality of microfluidic modules;

a material transport system operably coupled to each of the first fluidic element and the first and second microscale channels, for transporting material from the first fluidic element into and through the at least one of the first and second microscale channels;

a detector disposed in sensory communication with at least one of the first and second channels in the microfluidic modules, for detecting a signal within the at least one channel.

25. The microfluidic system of claim 24, wherein the material transport system comprises an electrokinetic material transport system.

26. The microfluidic system of claim 24, wherein the material transport system comprises a pressure based material transport system.

27. The microfluidic system of claim 24, wherein the material transport system comprises a hybrid electrokinetic/pressure-based material transport system.

28. The microfluidic system of claim 24, wherein at least one of the microfluidic modules comprises an external capillary element having a capillary channel disposed therethrough, the capillary channel being open at a first end and in fluid communication with at least one channel of the channel network in the microfluidic module at a second end of the capillary channel.

29. The microfluidic system of claim 24, wherein the detector comprises an optical detector disposed adjacent to at least one channel in the channel network of each microfluidic module, whereby the detector receives an optical signal from the at least one channel.

30. The microfluidic system of claim 29, wherein the optical detector comprises a fluorescence detector.

31. A method of manufacturing a multiplexed microfluidic device, comprising:
providing a substrate having at least a first fluidic element disposed therein, and a plurality of openings disposed from a surface of the substrate to the fluidic element; and attaching a plurality of microfluidic modules to the substrate, each microfluidic module comprising at least first fluidic element disposed therein and an opening providing access from a surface of the microfluidic module to the first fluidic element in the microfluidic module, wherein the fluidic element in each of the microfluidic modules comprises at least first and second intersecting microfluidic channels, the modules being attached to the substrate such that each of the plurality openings on the substrate is in fluid communication with an opening on a separate microfluidic module.

* * * * *